(12) United States Patent
Weissenborn et al.

(10) Patent No.: US 6,644,701 B2
(45) Date of Patent: Nov. 11, 2003

(54) BUMPER ENERGY ABSORBER WITH FOAM AND NON-FOAM PIECES

(75) Inventors: Mark Weissenborn, Grand Rapids, MI (US); Robert Weykamp, Grand Haven, MI (US); David Powell, Grand Haven, MI (US)

(73) Assignee: Shape Corporation, Grand Haven, MI (US)

( * ) Notice: Subject to any disclaimer, the term of this patent is extended or adjusted under 35 U.S.C. 154(b) by 0 days.

(21) Appl. No.: 10/105,111

(22) Filed: Mar. 22, 2002

(65) Prior Publication Data

US 2003/0132640 A1 Jul. 17, 2003

Related U.S. Application Data

(60) Provisional application No. 60/349,004, filed on Jan. 14, 2002.

(51) Int. Cl.[7] ............................................... B60R 21/14
(52) U.S. Cl. ..................... 293/120; 293/154; 293/109
(58) Field of Search ................. 293/102, 109, 293/110, 120, 154

(56) References Cited

U.S. PATENT DOCUMENTS

| | | |
|---|---|---|
| 831,755 A | 9/1906 | Husham |
| 1,247,569 A | 11/1917 | Palmer |
| 1,362,439 A | 12/1920 | Roberts |
| RE15,255 E | 12/1921 | Limacher |
| 1,429,061 A | 9/1922 | Coe |
| 1,499,986 A | 7/1924 | Kirsch |
| 1,927,442 A | 9/1933 | Laufle |
| 1,952,545 A | 3/1934 | Gotshall |
| 2,371,671 A | 3/1945 | Blount et al. |
| 2,734,407 A | 2/1956 | Smith |
| 3,392,566 A | 7/1968 | Sporck |
| 3,596,963 A | 8/1971 | Phillips |
| 3,762,195 A | 10/1973 | Kitanosono et al. |
| 3,768,850 A | 10/1973 | Barton et al. |
| 3,777,438 A | 12/1973 | Brown |
| 3,860,279 A  * | 1/1975 | Hulten ...................... 293/109 |
| 3,884,517 A | 5/1975 | Davidson |

(List continued on next page.)

FOREIGN PATENT DOCUMENTS

DE    3343709    6/1984

(List continued on next page.)

OTHER PUBLICATIONS

Exhibit A includes four pictures of a prior art vehicle bumper system on a 2001 Ford Focus model vehicle, which includes a steel beam and an energy absorber that wraps around ends of the beam. The energy absorber includes a lower–density black foam body and has several higher–density white foam blocks inset into an inner surface of the black foam. (Note: Photo 1 shows an "extra" energy absorber loosely setting on a rear bumper system of a Ford Focus, the "extra" energy absorber being reversed to show its inner surface with the white foam blocks exposed.).

*Primary Examiner*—Joseph D. Pape
(74) *Attorney, Agent, or Firm*—Price, Heneveld, Cooper, DeWitt & Litton

(57) ABSTRACT

A bumper system includes a bumper beam having a face and ends, and an energy absorber mounted on the face. The energy absorber has a foam piece engaging the face and an injection-molded end piece securely attached to each end of the foam piece and also engaging the face. By this arrangement, the energy absorber is a single unit that can be handled and attached to the bumper beam, and also can include different end pieces while still using the same foam piece. In one form, the energy absorber also includes a center injection-molded piece and, in another form, includes a long injection-molded piece having foam sections molded onto it.

16 Claims, 5 Drawing Sheets

U.S. PATENT DOCUMENTS

| | | | |
|---|---|---|---|
| 3,902,748 | A | 9/1975 | Bank et al. |
| 3,989,292 | A | 11/1976 | Bank et al. |
| 4,013,317 | A | 3/1977 | Reidelbach et al. |
| 4,022,505 | A | 5/1977 | Saczawa, Jr. |
| 4,066,285 | A | 1/1978 | Hall et al. |
| 4,072,334 | A * | 2/1978 | Seegmiller et al. ......... 293/110 |
| 4,095,831 | A | 6/1978 | Hagiwara et al. |
| 4,111,478 | A | 9/1978 | Pompei et al. |
| 4,225,167 | A | 9/1980 | Buettner et al. |
| 4,233,833 | A | 11/1980 | Balinski |
| 4,241,146 | A | 12/1980 | Sivachenko et al. |
| 4,248,072 | A | 2/1981 | Hasegawa et al. |
| 4,291,564 | A | 9/1981 | Muckli |
| 4,317,350 | A | 3/1982 | Sivachenko et al. |
| 4,320,913 | A | 3/1982 | Kuroda |
| 4,333,674 | A | 6/1982 | Buettner et al. |
| 4,361,352 | A | 11/1982 | Wakamatsu |
| 4,386,799 | A | 6/1983 | Molnar |
| 4,413,856 | A | 11/1983 | McMahan et al. |
| 4,422,680 | A | 12/1983 | Goupy |
| 4,433,565 | A | 2/1984 | Preller |
| 4,578,979 | A | 4/1986 | Abe et al. |
| 4,684,166 | A | 8/1987 | Kanodia |
| 4,714,287 | A | 12/1987 | Merkle |
| 4,715,630 | A | 12/1987 | Manning |
| 4,783,104 | A | 11/1988 | Watanabe et al. |
| 4,796,946 | A | 1/1989 | Wilson et al. |
| 4,811,979 | A | 3/1989 | Peter et al. |
| 4,862,666 | A | 9/1989 | Kero |
| 5,040,399 | A | 8/1991 | Knapper et al. |
| 5,154,462 | A | 10/1992 | Carpenter |
| 5,180,629 | A | 1/1993 | Terada et al. |
| 5,232,261 | A | 8/1993 | Kuroda et al. |
| 5,277,469 | A | 1/1994 | Klippel |
| 5,340,178 | A | 8/1994 | Stewart et al. |
| 5,385,375 | A | 1/1995 | Morgan et al. |
| 5,404,974 | A | 4/1995 | Thum et al. |
| 5,407,239 | A | 4/1995 | Arai et al. |
| 5,540,016 | A | 7/1996 | Clausen |
| 5,545,361 | A | 8/1996 | Rosasco |
| 5,560,662 | A | 10/1996 | Apgar, Jr. et al. |
| 5,672,405 | A | 9/1997 | Plank, Jr. et al. |
| 5,756,167 | A | 5/1998 | Tamura et al. |
| 5,785,376 | A | 7/1998 | Nees et al. |
| 5,799,991 | A | 9/1998 | Glance |
| 5,813,718 | A | 9/1998 | Masuda et al. |
| 5,857,734 | A | 1/1999 | Okamura et al. |
| 5,997,058 | A | 12/1999 | Pedersen |
| 6,000,738 | A | 12/1999 | Stewart et al. |
| 6,003,912 | A | 12/1999 | Schonhoff et al. |
| 6,042,163 | A | 3/2000 | Reiffer |
| 6,138,429 | A | 10/2000 | Baumgaertner |
| 6,179,353 | B1 | 1/2001 | Heatherington et al. |
| 6,318,775 | B1 | 11/2001 | Heatherington et al. |

FOREIGN PATENT DOCUMENTS

| | | |
|---|---|---|
| FR | 40075 | 4/1932 |
| FR | 766186 | 6/1934 |
| GB | 645721 | 11/1950 |
| GB | 2027516 | 2/1980 |
| GB | 1382693 | 3/1988 |
| GB | 563548 | 6/1993 |
| JP | 172603 | 4/1986 |
| JP | 169350 | 7/1986 |
| JP | 66008 | 3/1989 |
| JP | 240322 | 9/1989 |
| JP | 227750 | 8/1991 |
| JP | 24291 | 2/1993 |
| JP | 6286536 | 3/1993 |

* cited by examiner

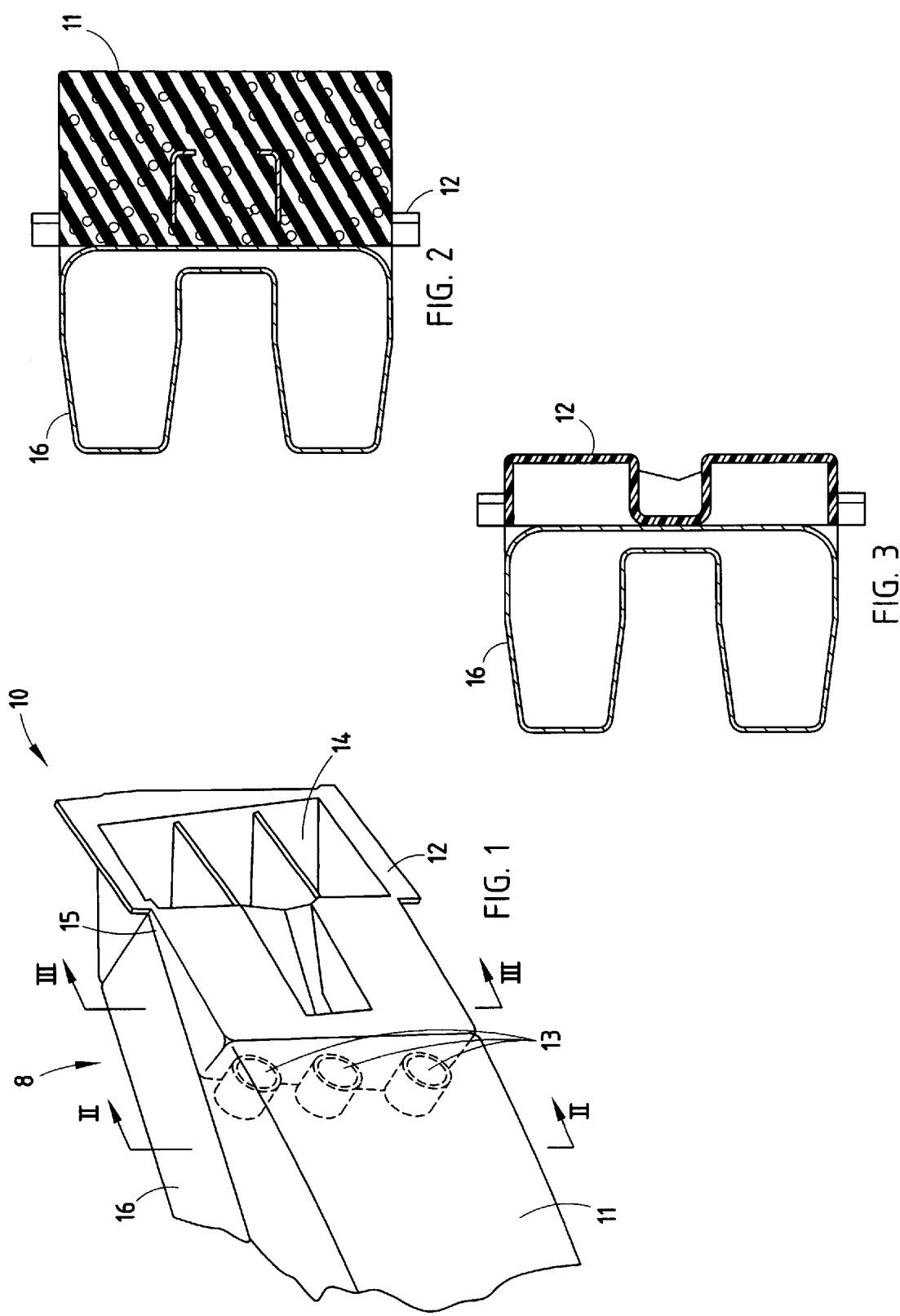

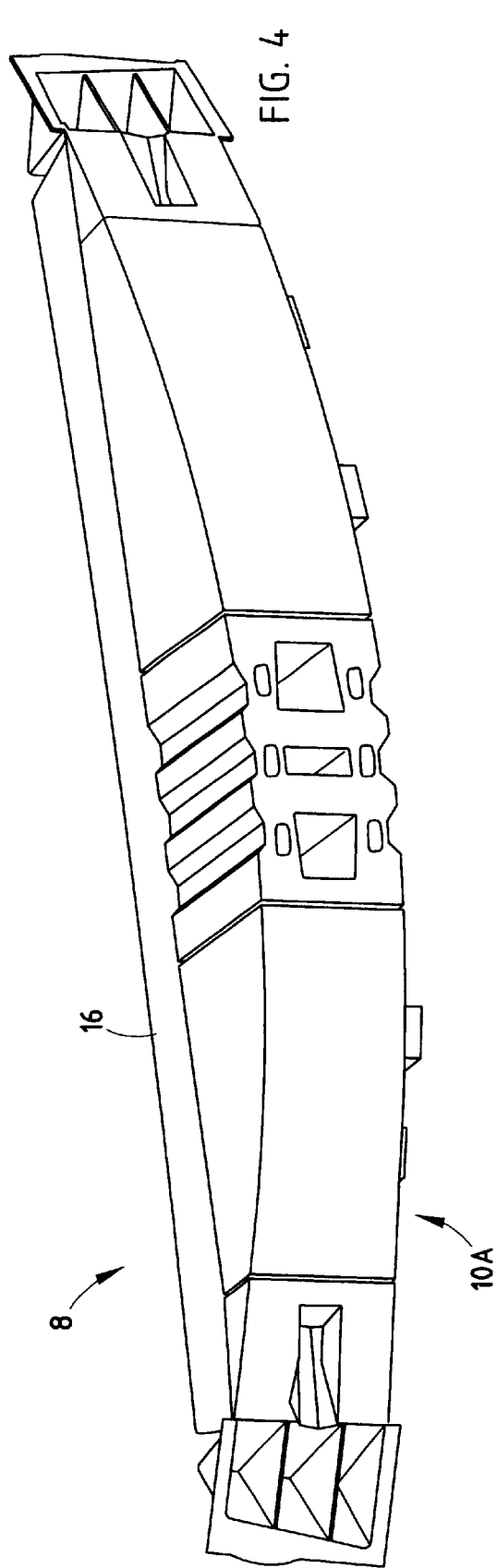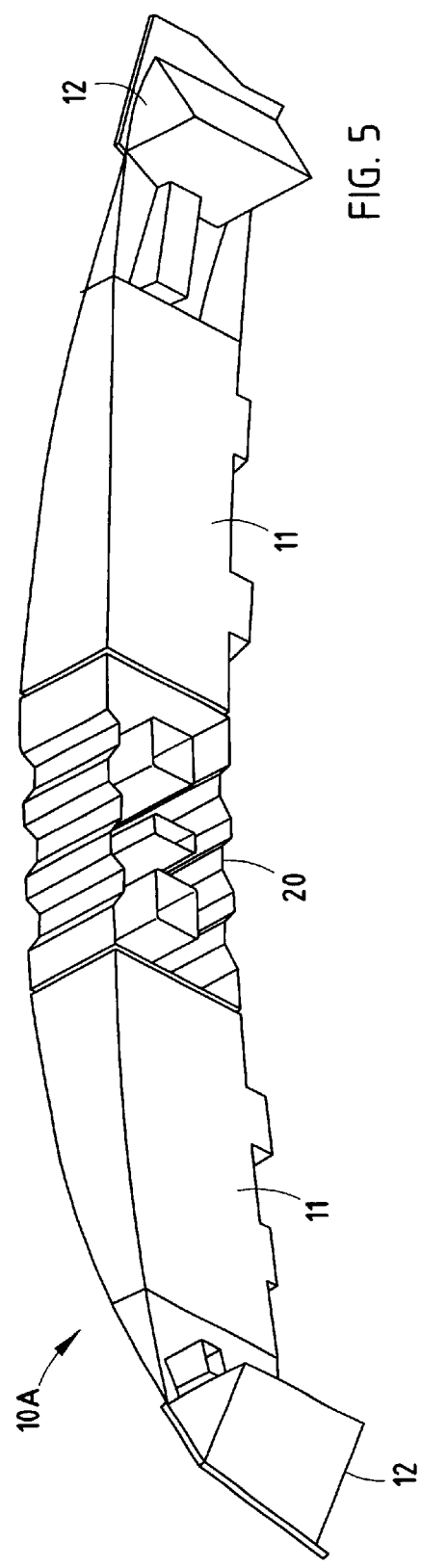

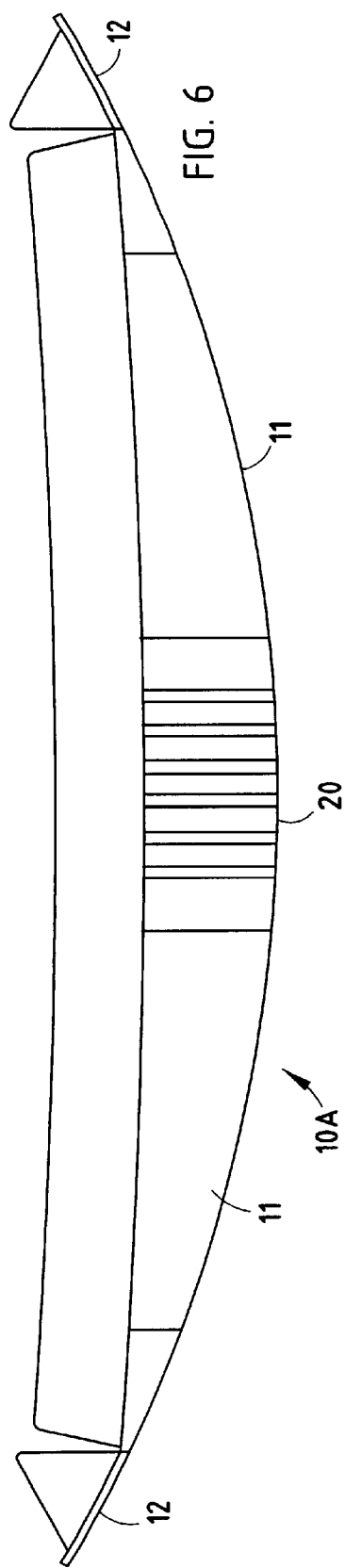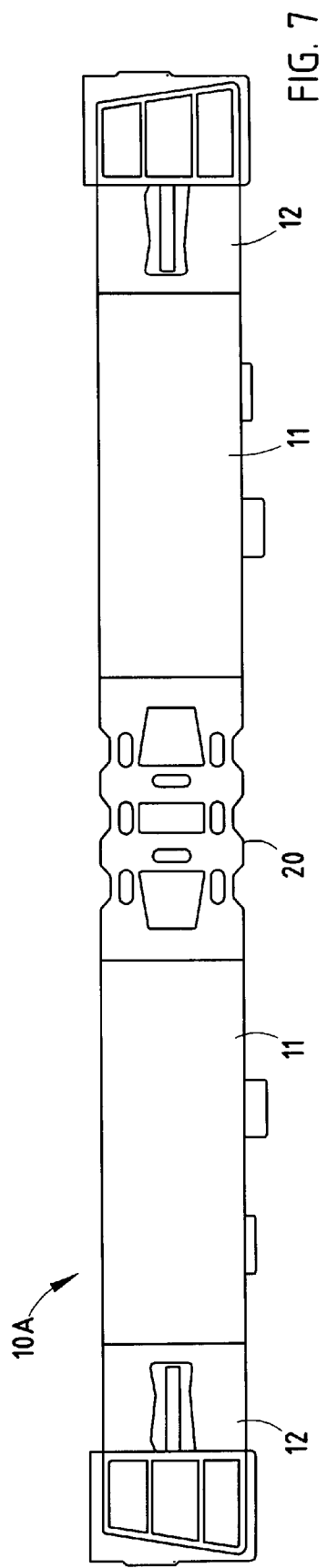

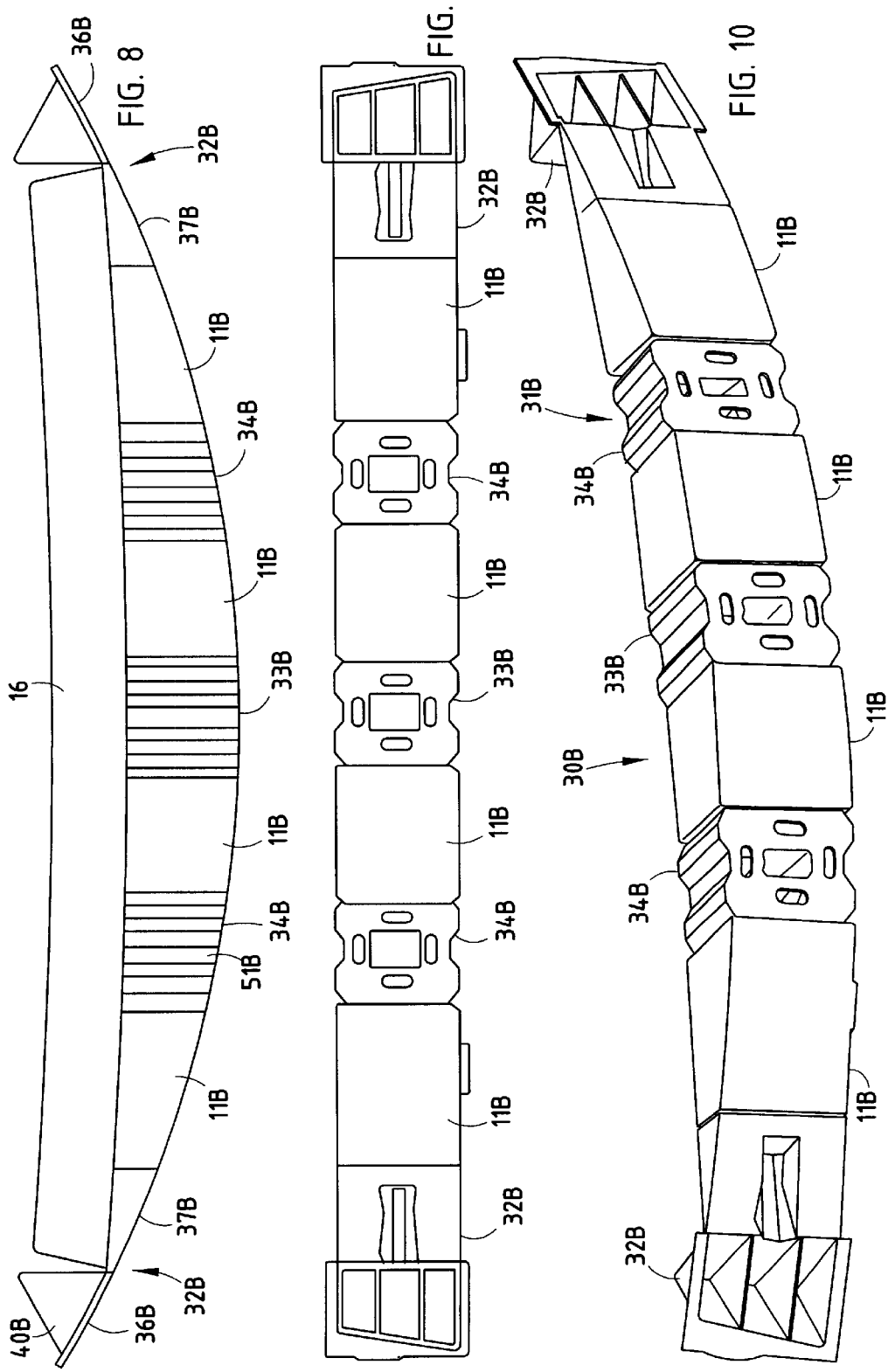

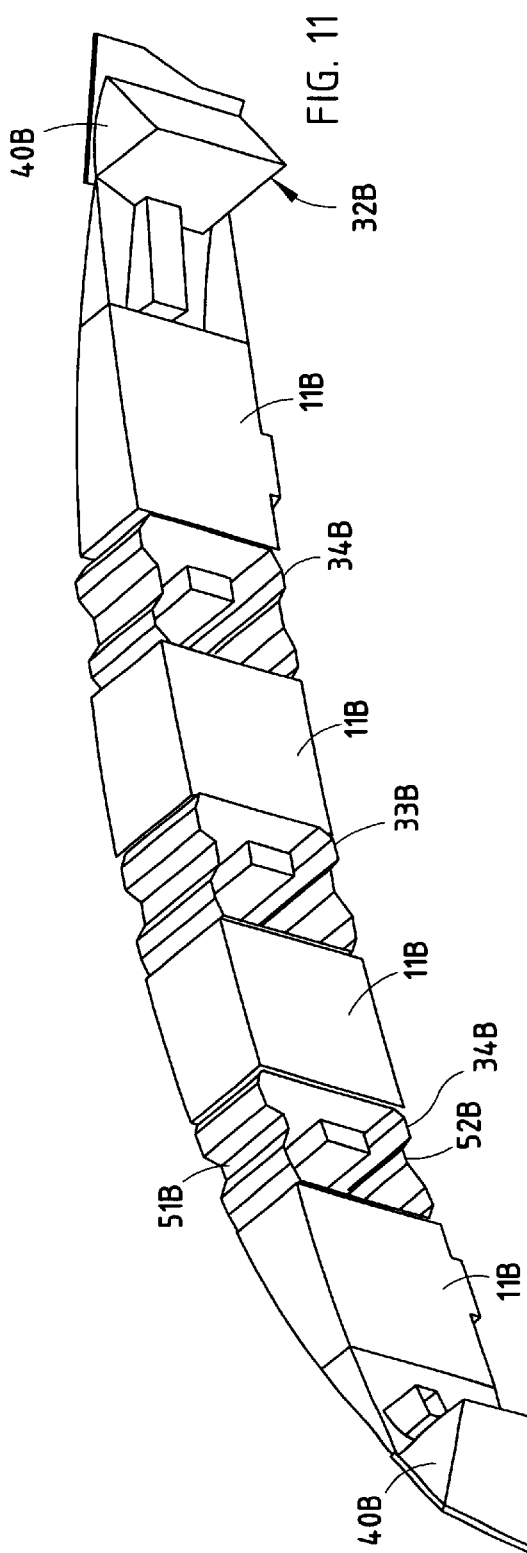
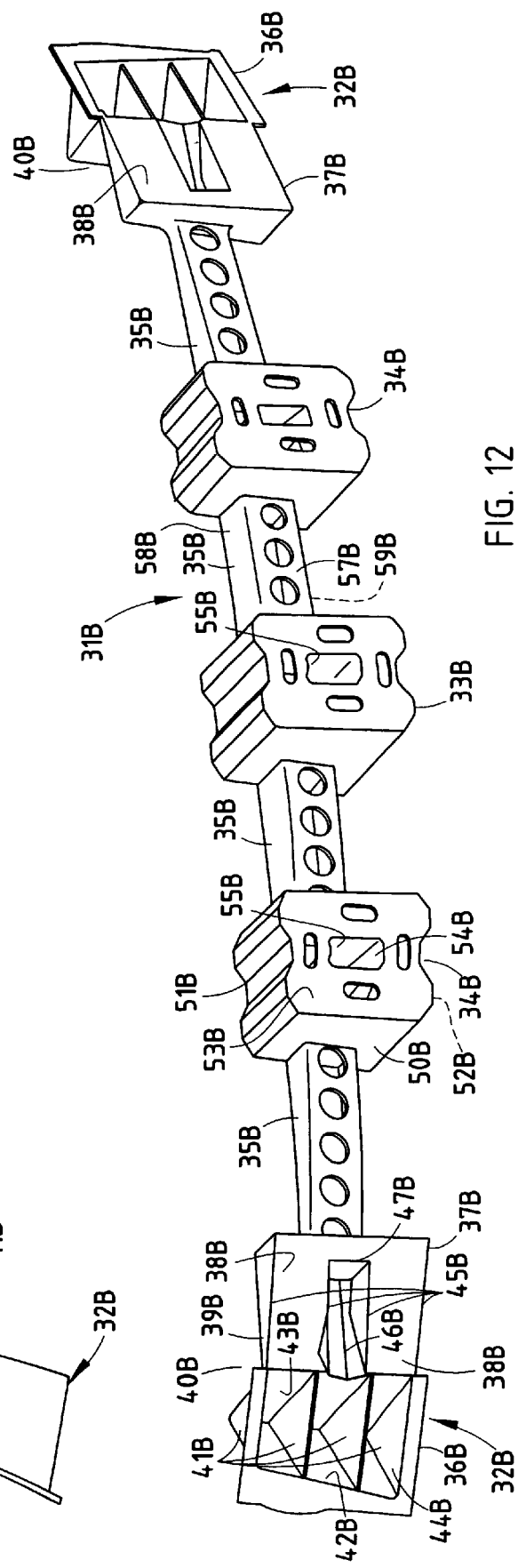

BUMPER ENERGY ABSORBER WITH FOAM AND NON-FOAM PIECES

CROSS-REFERENCE TO RELATED APPLICATIONS

This application claims benefit of provisional application serial No. 60/349,004, filed Jan. 14, 2002, entitled BUMPER WITH FOAM AND INTEGRALLY-ATTACHED INJECTION-MOLDED PIECES.

BACKGROUND

The present invention relates to vehicle bumper systems having an energy absorber on a bumper beam, and more particularly relates to a bumper system having an energy absorber on the beam that is adapted to provide different levels of energy absorption in selected areas but further adapted to take maximum advantage of mass production.

Vehicle bumper systems often include a bumper beam for strength and a mounted energy absorber to help absorb energy and distribute stress across the bumper beam during impact. However, each different model vehicle requires a slightly different shape or different energy absorption profile, such that each different model vehicle requires a different mold for the energy absorber. Each additional mold is expensive, because they are relatively large and long. Further, it takes time and labor to change molds, and requires downtime of the molding machine.

Accordingly, a bumper system is desired that includes an energy absorber solving the aforementioned problems and having the aforementioned advantages.

SUMMARY OF THE PRESENT INVENTION

In one aspect of the present invention, a bumper system includes a bumper beam having a face and ends, and an energy absorber mounted on the face. The energy absorber has a foam piece engaging the face and an injection-molded end piece securely attached to an end of the foam piece and also engaging the face.

In another aspect of the present invention, a bumper system includes a bumper beam having a face and ends, and an energy absorber mounted on the face. The energy absorber has at least one foam piece engaging the face and at least one non-foam plastic piece securely attached to an end of the foam piece and also engaging the face. The foam piece and the non-foam piece form a single member that can be handled and attached as a unit to the bumper beam.

In another aspect of the present invention, a method comprises steps of molding a non-foam plastic component. The method further includes molding a foam component and attaching the non-foam plastic component to the foam component to form a unitary member that can be handled as a unit. The method still further includes engaging the unitary member against a face of a bumper beam.

In another aspect of the present invention, a bumper system includes a bumper beam having a face surface, and an energy absorber engaging the face surface. The energy absorber has an elongated non-foam injection-molded component with at least three longitudinally-spaced enlarged sections and further has a plurality of foam sections attached to the molded components between the enlarged sections.

These and other aspects, objects, and features of the present invention will be understood and appreciated by those skilled in the art upon studying the following specification, claims, and appended drawings.

BRIEF DESCRIPTION OF DRAWINGS

FIG. 1 is a fragmentary perspective view of a bumper system including a bumper beam and a face-mounted energy absorber;

FIGS. 2–3 are cross sections taken along the lines II—II and III—III in FIG. 1;

FIG. 4 is a front perspective view of a second bumper system including a bumper beam and a modified face-mounted energy absorber;

FIG. 5 is a rear perspective view of the energy absorber shown in FIG. 4;

FIG. 6 is a top view of FIG. 4;

FIG. 7 is a rear view of FIG. 5;

FIGS. 8–9 are front and top views of a third bumper system;

FIGS. 10–11 are front and rear perspective view of the energy absorber shown in FIG. 8; and FIG. 12 is a front perspective view of an injection molded solid plastic component of the energy absorber shown in FIGS. 10—11.

DETAILED DESCRIPTION OF PREFERRED EMBODIMENTS

A bumper system 8 (FIG. 1) includes a bumper beam 16 having a face and ends, and an energy absorber 10 mounted on the face. The energy absorber has a center-located foam piece 11 engaging the face and an injection-molded end piece 12 securely attached to each end of the foam piece and also engaging the face. By this arrangement, the energy absorber is a single unit that can be handled and attached to the bumper beam, and also the energy absorber can include different end pieces while still using the same foam piece.

More specifically, the energy absorber 10 is adapted to advantageously use a common center piece 11 made of foam, and any one of a variety of different injection-molded end pieces attached to the foam. The illustrated end piece 12 includes loops or attachment flanges 13 and is insert-molded onto an end of the foam piece 11 when forming the foam piece 11. The end piece 12 includes a front surface 14 angled to match the corner of its particular vehicle, and a notched back surface 15 shaped to mateably receive an end of the bumper beam 16 that it rides on. It is contemplated that different attachment means can be used to attach pieces 11 and 12 together, including adhesive, mechanical attachment, different tabs for insert-molding into the foam, and barb-like tabs that can be poked into the foam, etc. Since the same center piece is used for a number of different models, the overall cost of molding dies is greatly reduced. Restated, the cost of several small injection-molding dies for molding a variety of different end pieces and one large die for the foam center piece is much lower than the cost of making a multitude of different huge dies.

A second energy absorber 10A (FIGS. 4–7) is mounted to a face of a bumper beam 8 and includes a center-located injection-molded non-foam plastic center piece 20, foam pieces 11 attached to each end of the center piece 20, and injection-molded non-foam end pieces 12 attached to outer ends of each of the foam pieces 11. The pieces 11, 12, and 20 are each molded for optimal localized energy absorption (i.e. for an optimal force versus deflection curve, as well as for total energy absorption based on localized/area-specific impacts and based on particular types of impacts). For example, the injection-molded pieces 12 and 20 include a plurality of interconnected webs forming a honeycomb structure capable of substantial energy absorption prior to deflection of the bumper beam itself.

A modified bumper system (FIGS. 8–9) includes a roll-formed B-shaped bumper beam 16 and a modified energy absorber 30B abutted against its face surface. The energy absorber 30B (FIGS. 10–11) includes an injection-molded piece 31B, and multiple foam pieces 11B molded onto the injection-molded piece 31B. The injection-molded piece 31B (FIG. 12) is molded of a non-foamed "solid" polymer and includes molded end sections 32B (similar to end pieces 12), and molded center and intermediate sections 33B and 34B, all interconnected by longitudinal straps 35B. The end sections 32B each include a triangular outer portion 36B and a triangular inner portion 37B forming a rearwardly-swept angled front surface 38B and a stepped back surface 39B with a pocket 40B shaped to receive the end of the beam 16. The outer portion 36B includes four parallel walls 41B that extend parallel a length of the beam 16, and that combine with angled walls 42B and 43B to define a honeycomb-like structure in the form of three forwardly open pockets 44B. The inner portion 37B has four parallel walls 45B that combine with angled walls 46B and 47B to define a rigid structure on the face of the end of the bumper beam 16. The honeycomb-like structure of the outer portion 36B and the inner portion 37B combine to provide optimal energy absorption at ends of the bumper beam 16 for optimal corner impact resistance and crush characteristics. The walls 41B and 45B are generally parallel and aligned with each other and extend in a horizontal plane (when in a car-mounted position), such that good corner impact strength is provided. It is noted that the inner and outer portions 36B and 37B are configured to allow a simple molding die, without the need for making undercuts, blind surfaces, and without the need for complex die pulls and slides.

The center and intermediate sections 33B and 34B each comprise rearwardly-open box-shaped sections formed by side walls 50B, a top wall 51B, a bottom wall 52B and a front wall 53B. An opening 54B is formed in each of the front walls 53B, and a centered tubular "crush tower" of material 55B extends rearwardly from the marginal material forming the opening 54B to a rear of the energy absorber. The box-like shape of walls 50B/51B/52B/53B along with the crush tower 55B adds considerably to the impact strength of the energy absorber 30B and adds to control over the crush sequence and characteristics of impact and bumper system crush stroke versus energy absorption. If the crush tower 55B ends short of the bumper beam 16, then the crush sequence has a stepped function, where the initial crush strength is a little lower, and when energy absorber 30B crushes to the point where the crush tower 55B hits the bumper beam 16, the impact strength suddenly increases for additional crush stroke distances. Also, the top and bottom walls 51B and 52B are wavy or undulated to provide increased impact strength.

The straps 35B (FIG. 12) extend between and interconnect each of the sections 32B, 33B, and 34B. Their cross sections define a rearwardly-facing U-shape, and are formed by front wall 57B, and top and bottom walls 58B and 59B. The straps 35B permit flexing movement, until the foam sections 11B are molded onto the pieces 31B, at which time the energy absorber 30B becomes stiff enough to easily handle and assemble onto the bumper beam 16.

It is noted that the entire illustrated energy absorber 30B is configured so that it can be molded by a relatively simple molding die, where the die does not include draws, slides, and other moving complex components for making blind and/or hidden surfaces. This greatly simplifies and improve tooling, and reduces costs of making the die and keeping the die maintained and operational.

It is to be understood that variations and modifications can be made on the aforementioned structure without departing from the concepts of the present invention, and further it is to be understood that such concepts are intended to be covered by the following claims unless these claims by their language expressly state otherwise.

We claim:

1. A bumper system comprising:

a bumper beam having a face and ends; and an energy absorber mounted on the face, the energy absorber having a foam piece engaging the face and an injection-molded end piece securely attached to an end of the foam piece and also engaging the face.

2. The bumper system defined in claim 1, wherein the injection-molded end piece includes attachment flanges that extend into the foam piece and anchor the injection-molded end piece in the foam piece.

3. The bumper system defined in claim 1, wherein the injection-molded end piece is insert-molded into the foam piece during the process of molding the foam piece.

4. The bumper system defined in claim 1, including a second injection-molded piece securely attached to a second end of the foam piece.

5. The bumper system defined in claim 4, wherein the second injection-molded piece comprises a second injection-molded end piece.

6. The bumper system defined in claim 5, including a second foam piece and a center-located third injection-molded piece, the first and second foam pieces being securely attached to ends of the center-located third injection-molded piece, and the first and second end pieces being attached to outer ends of the first and second foam pieces, respectively.

7. A bumper system comprising:

a bumper beam having a face and ends; and an energy absorber mounted on the face, the energy absorber having at least one foam piece engaging the face and at least one non-foam plastic piece securely attached to an end of the foam piece and also engaging the face, the foam piece and the non-foam piece forming a single member that can be handled and attached as a unit to the bumper beam.

8. A bumper system comprising:

a bumper beam having a face surface; and an energy absorber engaging the face surface, the energy absorber having an elongated non-foam component with at least three longitudinally-spaced enlarged sections and a plurality of foam sections attached to the non-foam component between the enlarged sections, at least one of the enlarged sections including a front wall with marginal material forming an opening therein.

9. The bumper system defined in claim 8, wherein the foam sections each fill a space defined between sides of the adjacent enlarged sections.

10. The bumper system defined in claim 8, wherein the enlarged sections are each box-shaped and have a hollow interior space.

11. A bumper system comprising:

a bumper beam having a face surface; and an energy absorber engaging the face surface, the energy absorber having an elongated non-foam injection-molded component with at least three longitudinally-spaced enlarged sections and a plurality of foam sections attached to the molded component between the enlarged sections; wherein the enlarged sections are each box-shaped and have a hollow interior space, and further wherein the enlarged sections each include a front wall with marginal material forming an opening therein.

12. The bumper system defined in claim 11, including a crush tower tube that extends from the marginal material rearwardly toward the bumper beam.

13. The bumper system defined in claim 8, wherein the non-foam component is one-piece and the enlarged sections are interconnected by connecting straps.

14. The bumper system defined in claim 8, wherein the non-foam component includes end piece sections and wherein the enlarged sections include at least one centered box-shaped section.

15. The bumper system defined in claim 8, wherein a front surface of the energy absorber includes first areas defined by the non-foam component, and further includes second areas defined by the foamed sections.

16. The bumper system defined in claim 8, wherein the non-foam component includes end sections each having a pocket shaped to receive an end of the bumper beam.

* * * * *